… [19]

United States Patent

Guenther et al.

[11] 4,313,392

[45] Feb. 2, 1982

[54] SYSTEM FOR DEPLOYING AND RETRIEVING SEISMIC SOURCE ASSEMBLY FROM MARINE VESSEL

[75] Inventors: Robert O. Guenther, Irving; Donald F. Huffhines, Richardson, both of Tex.

[73] Assignee: Mobil Oil Corporation, New York, N.Y.

[21] Appl. No.: 68,312

[22] Filed: Aug. 20, 1979

[51] Int. Cl.³ .............................................. B63B 21/66
[52] U.S. Cl. ..................................... 114/244; 403/169
[58] Field of Search ............. 114/242, 243, 244, 245, 114/253, 254; 367/106, 130; 403/169, 174, 178; 24/116 R; 104/94, 107, 108

[56] References Cited

U.S. PATENT DOCUMENTS

| | | | |
|---|---|---|---|
| 994,865 | 6/1911 | Morris et al. | 24/116 R |
| 2,780,196 | 2/1957 | Jareckie | 114/244 |
| 3,461,830 | 8/1969 | Pearce et al. | 114/243 |

FOREIGN PATENT DOCUMENTS

| | | | |
|---|---|---|---|
| 718662 | 9/1965 | Canada | 104/94 |
| 1231486 | 5/1971 | United Kingdom | 114/244 |
| 1417948 | 12/1975 | United Kingdom | 114/244 |

*Primary Examiner*—Sherman D. Basinger
*Attorney, Agent, or Firm*—Charles A. Huggett; Michael G. Gilman; Frank J. Kowalski

[57] ABSTRACT

A system for deploying and retrieving a seismic source assembly from a marine seismic vessel. The system comprises a guide track which is secured to the underside of an upper deck of the vessel. The chain which absorbs most of the strain due to towing passes through the track and is safely confined therein during the deployment and retrieval of the source assembly. A connector is attached to the chain at each point where a seismic source and a buoy line is to be attached. As the chain is unreeled and as each connector approaches the track, a source and a buoy line is attached to that respective connector. The track is constructed so a connector on the chain with both a source and a buoy line attached can pass therethrough. This procedure is continued until the seismic source assembly is deployed. The procedure is reversed to retrieve the source assembly.

5 Claims, 7 Drawing Figures

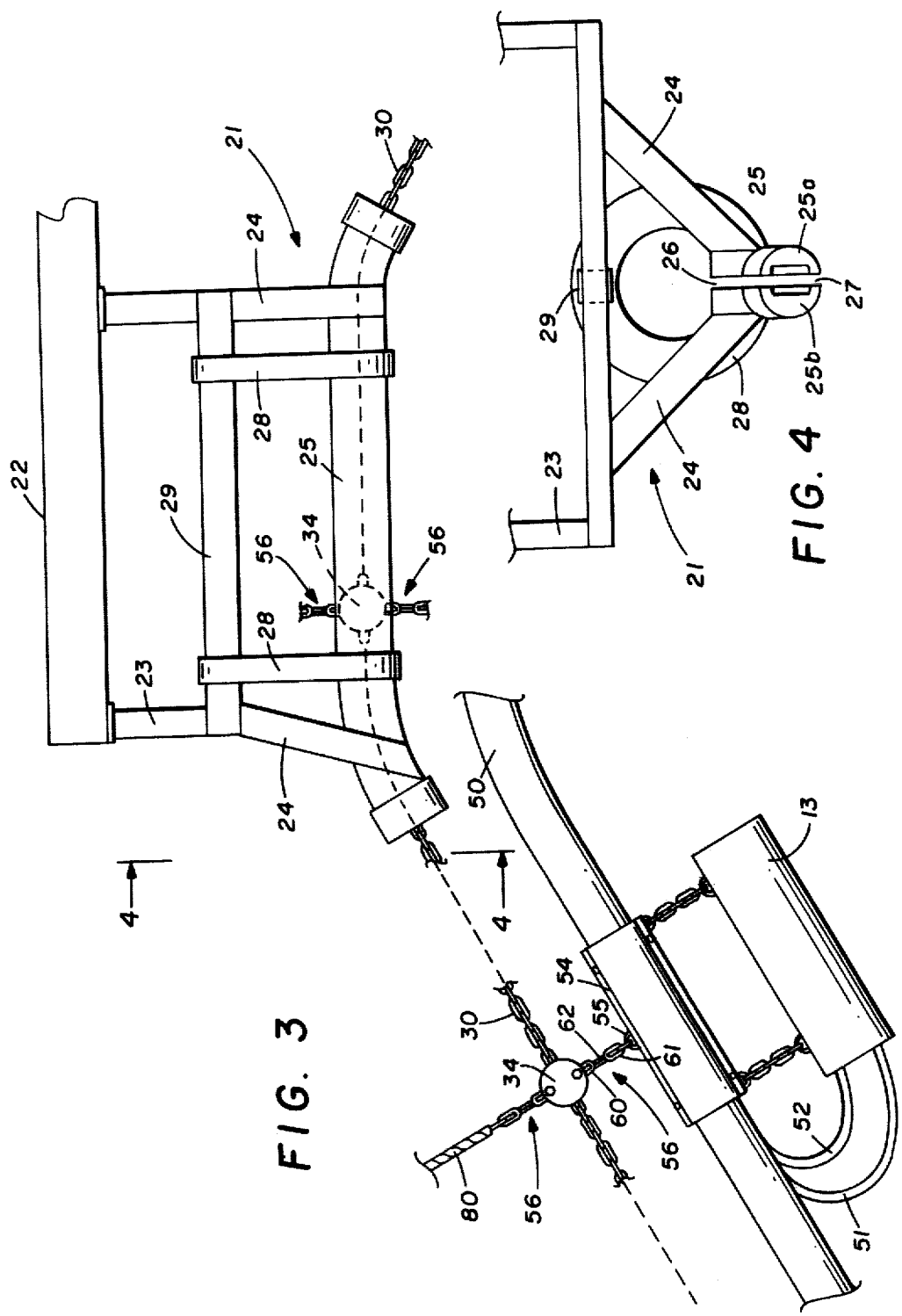

SYSTEM FOR DEPLOYING AND RETRIEVING SEISMIC SOURCE ASSEMBLY FROM MARINE VESSEL

BACKGROUND OF THE INVENTION

The present invention relates to a deployment and retrieval system for a marine seismic source and more particularly relates to a system to deploy and retrieve a seismic source assembly from the stern of a marine seismic vessel in a safe and efficient manner.

In a typical marine seismic operation, an electronically equipped vessel tows both a seismic source assembly and a seismic cable or streamer through an area to be investigated. The source assembly is actuated to generate signals which in turn reflect off various strata underlying the marine bottom. These reflected signals are received by each of a plurality of receivers, e.g. hydrophones or the like, which are spaced along the length of the streamer. The received signals are recorded and processed to produce the desired seismic record.

In recent years, seismic source assemblies have become more and more sophisticated and, hence, more difficult to deploy and retrieve. Today, it is common to have a plurality of sources (e.g. chambers adapted to instantaneously discharge a burst of compressed air under high pressure) spaced along a flexible core or hose which, in turn, may extend several hundred feet behind a vessel when fully deployed. Conduits for supplying air to the chambers and lines for actuating the chambers and for transmitting data from the chambers to the vessel are all encased in the assembly. Also, a strain absorbing member, e.g. wire rope, is normally encased in the hose and runs throughout its length to protect the hose assembly from possible damage due to the strain experienced as the assembly is towed behind the vessel.

As an added precaution against strain damage, it is common to deploy a relatively heavy strain absorbing element, e.g. a chain, along with the hose assembly and attach the hose assembly to the chain at spaced points as both are deployed from the vessel. The major portion of the strain experienced by the hose assembly during towing will be absorbed by the chain. Also as the chain and the hose assembly are deployed, buoys are attached thereto usually at the same points as where the sources are attached. The buoys not only mark the path of the seismic hose assembly but also aid in maintaining it at a desired depth during operation.

At the end of a seismic operation, the seismic hose assembly is retrieved onto the vessel. The buoys are detached from the hose assembly and the chain is also detached and coiled onto a reel for storage. The sources, themselves, normally remain attached to the hose assembly and are stacked and stored as a unit on columns or bulkheads on the vessel, as is known in the art.

Previously, the deployment and retrieval of the seismic hose assembly has involved a delicate and difficult procedure. The chain was merely positioned within an open guide trough on the deck of the ship with each seismic source being attached to the chain during deployment while both source and the chain are lying side by side on the deck. A source after it was attached was then dragged across the deck (approximately 25 feet) and a buoy line was attached just before the source was deployed over the stern. Not only did this present possible damage to the expensive sources and related electrical and pneumatic llines but more importantly, also presented a less than desirable condition for the personnel handling the source assembly. For example, heaving of the vessel due to rough weather or the like could cause the chain to jump out of the open track and whip wildly about the deck, endangering personnel nearby. When the source assembly was retrieved, the chain and the attached sources were pulled roughly over the stern onto the deck and both the source and its control lines could easily be damaged during this operation. Accordingly, the need for a safer and more efficient deployment and retrieval system is evident.

SUMMARY OF THE INVENTION

The present invention provides a system for deploying and retrieving a seismic source assembly from a marine seismic vessel in a safe and efficient manner.

Structually, the system comprises a guide structure which is attached to the underside of upper deck of the vessel at the stern of the vessel. A line element, i.e. chain, which is used to absorb most of the strain experienced by the seismic source assembly during towing, is stored on a reel on the deck below and is threaded through the guide structure at the beginning of a deployment operation. The guide structure safely confines the chain in a defined path and prevents it from becoming free to whip about the deck even in rough weather.

Connectors, which once in place normally remain affixed to the chain, are positioned along the chain at spaced intervals where the seismic sources of the seismic source assembly are to be attached to the chain. These connectors are constructed so that both a seismic source and a buoy line can easily be attached and detached from each connector.

To deploy the seismic source assembly, the chain is threaded through an enclosed track on the guide structure and is unreeled until a connector approaches the track. A seismic source on the seismic source assembly is attached to the lower side of the connector while a line from a buoy is attached to the upper side of the connector. The track is constructed to allow the connector with both the seismic source and buoy line attached to pass through the track. However, in some instances it may be more convenient to attach the buoy line after the connector passes through the track. This procedure is repeated until all of the seismic sources and buoys are attached to the connectors on the chain and the seismic source assembly is deployed.

To retrieve the seismic source assembly, this procedure is reversed. The chain is reeled in through the track. Since the track is on the underside of the upper deck, the chain will sufficiently lift the source assembly (and each individual source) as it is retrieved so that it will easily clear the stern without dragging thereon, thereby eliminating possible damage to the source assembly. As the source assembly is retrieved, each seismic source and buoy line are detached from its respective connector after the connector passes through the track. Again, in some instances, it may be desirable to detach the buoy line before the connector passes through the track which can be easily accomplished. This procedure is continued until the entire seismic source assembly is retrieved. The chain with connectors intact is stored on the reel while the seismic source assembly is stacked on the vessel until time for the next seismic operation.

BRIEF DESCRIPTION OF THE DRAWINGS

The actual construction, operation, and the apparent advantages of the invention will be better understood by referring to the drawings in which like numerals identify like parts and in which:

FIG. 3 is an enlarged elevational view of the deployment and retrieval system of FIG. 2;

FIG. 4 is an end view taken along line 4—4 of FIG. 3 with the chain removed;

DESCRIPTION OF THE PREFERRED EMBODIMENT

Figure 1:
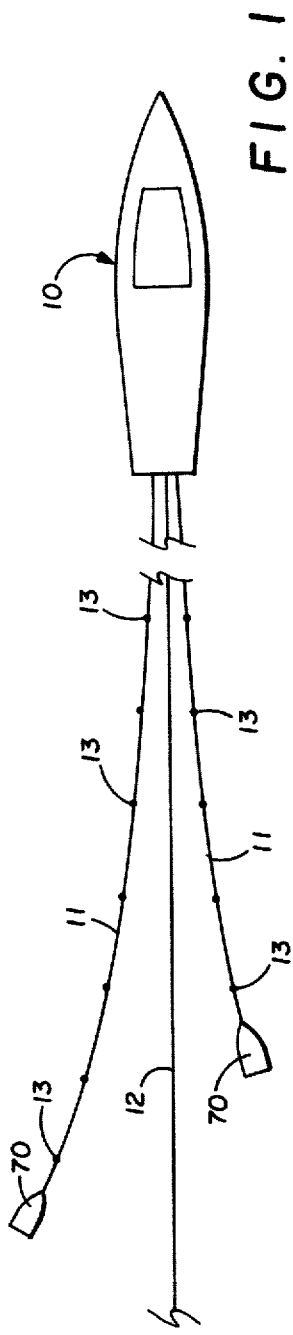
FIG. 1 is a plan view of a marine vessel carrying out a typical marine seismic operation.

Referring more particularly to the drawings, FIG. 1 discloses a plan view of a typical marine seismic operation wherein an electronically equipped vessel 10 is towing two seismic source hose assemblies 11 and a seismic cable on streamer 12. As will later be described in greater detail, each seismic hose assembly 11 has a plurality of signal generators or sources 13 spaced at prescribed intervals along its length. As understood in the art, assemblies 11 may be of the same or of different lengths, and sources 13 may be of any number which may be positioned at any prescribed intervals along its length. Further, in the present invention, sources 13 may be any device capable of generating a signal of sufficient strength to investigate the strata of interest, e.g. a chamber adapted to instantaneously release a burst of compressed air under high pressure. As used in this invention, "source" refers not only to a single generator but also, is intended to include sources comprised of two or more signal generators mounted on a single frame or the like and connected at a single position along hose assembly 11.

As is well known, sources 13 are actuated in a planned sequence to generate signals which, in turn, pass downward through the body of water and reflect off various strata underlying the marine bottom. The reflected signals which constitute the data from which the seismic record is ultimately formed are received by a plurality of receivers, e.g. hydrophones or the like (not shown), positioned at spaced points along streamer 12.

Figure 2:
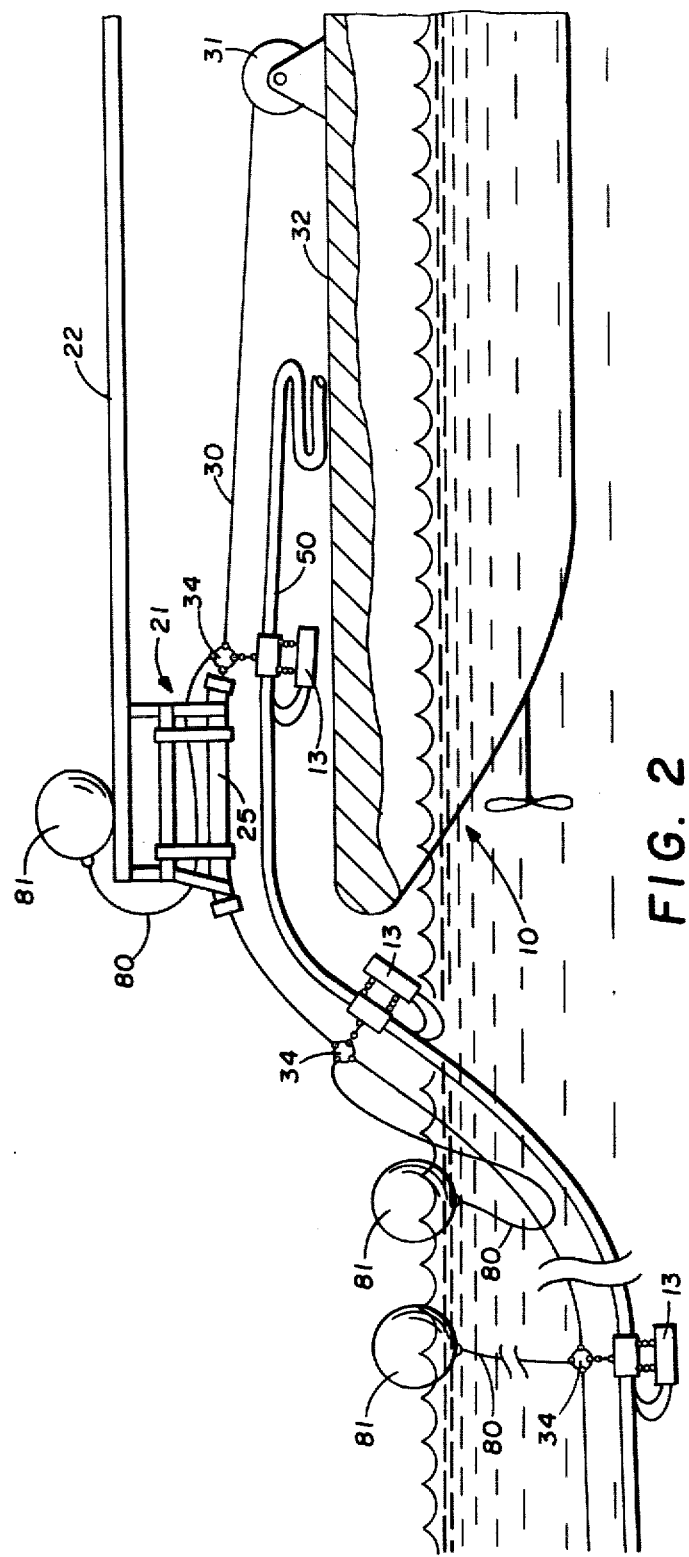
FIG. 2 is a partial elevational view, partly in section, of a marine vessel incorporating the deployment and retrieval system of the present invention.

Referring now to FIGS. 2, 3 and 4, a system 20 is disclosed for deploying and retrieving seismic hose assembly 11. Although only one system 20 will be described, it should be understood that vessel 10 as illustrated in FIG. 1 would have a separate system 20 positioned on either side of the stern for each of hose assemblies 11. System 20 is comprised of guide structure 21 which is mounted to the underside of upper deck 22 of vessel 10. Chain guide 21 has a frame member 23 which, in turn, has braces 24 attached thereto which support track 25. Track 25 is constructed from two separate, mirrored sections 25a, 25b (FIG. 4) which are held in a spaced relationship to thereby form continuous top and bottom slots 26, 27, respectively, along the entire length of track 25 for a purpose to be described below. Additional supports in the form of stiffening rings 28 are attached to beam 29 on the underside of upper deck 22 and provide additional rigidity to sections 25a and 25b to maintain them in their desired relationship.

Also comprising part of system 20 is strain absorbing means, e.g. chain 30, which is normally stored on reel 31 which, in turn, is mounted on lower deck 32 of vessel 10 (FIG. 2). Positioned on chain 30 at points corresponding to the desired spacing of sources 13 are connectors 34.

Figure 5:
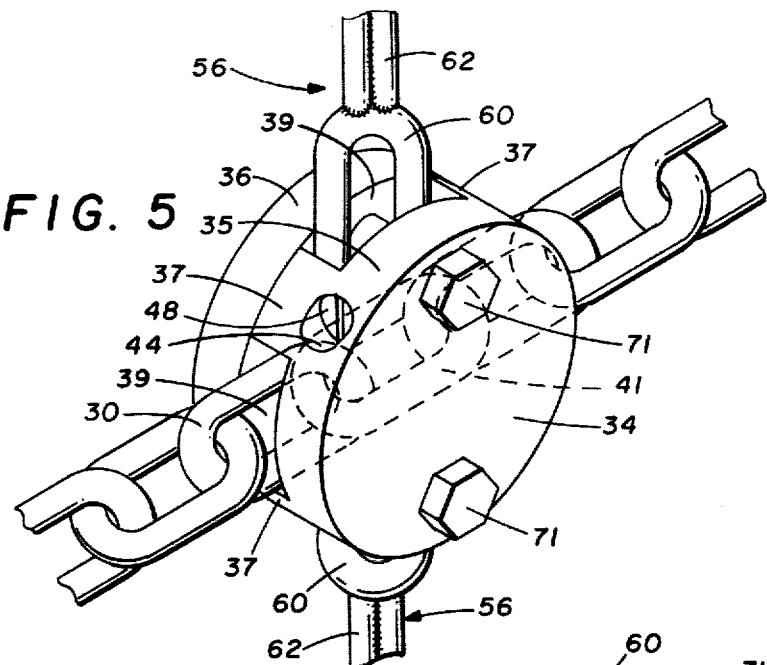
FIG. 5 is a perspective view of a connector in accordance with the present invention.
Figure 7:
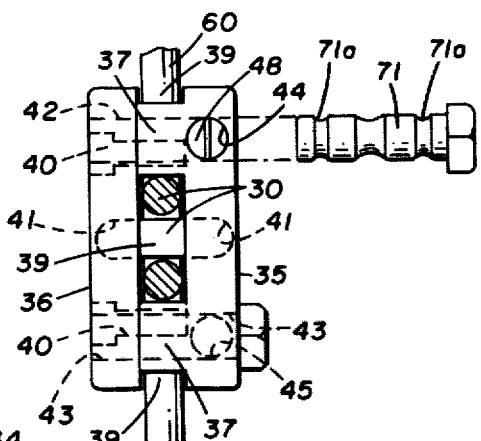
FIG. 7 is an end view of the connector of FIGS. 5 and 6 and of a pin used to secure an element in the connector.

As best seen in FIG. 5, each connector 34 is comprised of large section 35 and small section 36 as illustrated, large section 35 has four, equally spaced projections 37 thereon which when positioned against small section 36 define four openings or slots 39 in connector 34. Screws 40 (FIG. 7) hold sections 35 and 36 together when connector 34 is in an assembled condition. Machined or casted in each section 35, 36 is an internal groove 41, these grooves lying opposite each other when the sections are joined (FIG. 7). Grooves 41 have a shape which conforms to the general shape of a link in chain 30 so that they will snuggly receive a link in chain 30 when connector 34 is assembled onto chain 30.

Both sections 35 and 36 have two holes 42, 43 formed therein which, respectively, line up to form two openings completely through connector 34 when sections 35 and 36 are assembled. Section 35, also, has two additional openings 44, 45 formed therein which lie substantially perpendicular to holes 42, 43, respectively, as clearly shown in FIG. 6. A detent 46 is slidably positioned in each opening 44, 45 (only one shown) which extends slightly into hole 44, 45 when in a fully extended position. Spring 47 normally biases detent 46 to its extended position and is held within opening 44, 45 by threaded plug 48 or the like.

To assemble connectors 34 onto chain 30, a link is selected at a desired position on chain 30 where a source 13 is to be attached. The link is laid into groove 41 on one section of connector 34. The other section of connector 34 is then positioned so the selected link also lies in groove 41 of the other section and screws 40 are inserted to connect the sections together, thereby locking connector 34 onto chain 30 at the desired position. It is noted that the links adjacent to the selected link will extend from connector and will be snuggly held by slots 39 in connector 34. Connector 34 cannot move from its selected position on chain 30 which is an important consideration in seismic operations. Also, connectors 34 normally are such that they will not interfere with reeling chain 30 onto reel 31 so they will remain on chain 30 once they are assembled thereon.

Seismic source assembly 11, as illustrated, is constructed as a unit and is comprised of a core or hose 50 having a plurality of sources 13 spaced at selected interval along its lengths. Sources 13 normally remain affixed to hose 50 and are not routinely removed during deployment or retrieval. A conduit 51 for supplying air to source and electrical lead 52 for actuating the source and for transmitting data from the source run through hose 30 and exit at each source. A wire line or the like (not shown) is also usually provided in hose 50 to absorb strain thereby protecting the hose assembly during the seismic operation. Although, the above seismic source assembly construction is being described as typical, other seismic source assemblies having different constructions could be used equally as well in the present invention.

As shown in FIG. 3, source 13 is affixed to hose 50 by means of split sleeve 54 which is bolted around hose 50. Sleeve 54 has an eye 55 thereon which in turn has connector element 56 attached thereto. Preferably, connector element 56 is comprised of two links 60, 61 of the same size as those of chain 30 with a flat bar 62 welded between the links. Now that the structure of the present invention has been described, the operation of system 20 will be set forth.

Figure 6:
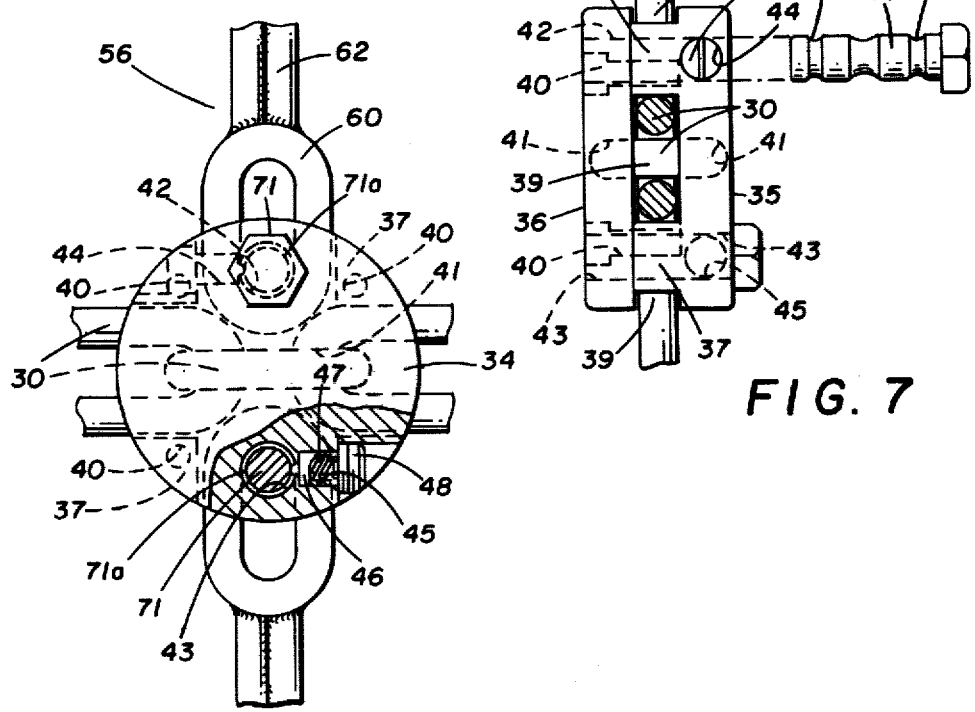
FIG. 6 is a side view, partly in section, of the connector of FIG. 5.

To deploy seismic hose assembly 11, the end of chain 30 is fed off reel 31 and is threaded through chain track 25. A drag element 70 (FIG. 1), e.g. a wooden paravane or the like is attached to the end of chain 30 and dropped over the stern of vessel 10. As chain 30 is played out from reel 31, drag element 70, and movement of vessel 10 will cause chain 30 to be deployed behind vessel 10. Connectors 34 are preassembled onto chain 30 at desired intervals and when a connector approaches track 25, chain 30 is halted. Connector element 56 on a corresponding source 13 on assembly 11 is inserted in the lower slot 39 of connector 34. A pin 71 (FIG. 7) is inserted into hole 43 in connector 34 to secure link 60 of connector element 56 in place. Pin 71 has two detent grooves 71a positioned inward from either end thereof, each groove adapted to receive detent 46 (FIG. 6). This allows pin 71 to be inserted from either side of connector 34 as the situation may dictate. Pin 71 also has a center groove 71b adapted to receive link 60 of connector element 56. It can be seen that detent 46 and the downward weight of source 13 in groove 71b will hold pin 71 in connector 34 so there is no danger of pin 71 dislodging during the seismic operation.

At the same time line 80 on buoy 81 (which rests on the top of deck 22 is passed through chain guide 21 and the connector element 56 on line 80 is inserted into upper slot 39 of connector 34. Another pin 71 is inserted into hole 42 to secure the line 80 to chain 30. It is noted that once buoy 81 is deployed into the water, the buoyant force on connector element 56 will pull link 60 upward in groove 71b to aid in preventing pin 71 from accidentally dislodging from hole 42. It is pointed out here that if desired, buoy line 80 could be attached in the same manner as described after the connector has passed through track 25.

Chain 30 is now again unreeled so the connector 34 moves into support track 25. The link 60 of connector element 56 on source 30 moves into lower slot 27 while link 60 of connector element 56 on line 80 moves into upper slot 26 of support track 25. Buoy 81 is thrown overboard and hose assembly 11 is deployed off the stern of vessel 10. The deployment of hose assembly 11 is continued until the next connector 34 approaches track 25 at which time the unreeling of chain 30 is stopped and a buoy 81 and source 13 are attached to connector 34 in the same manner as described above. This procedure is continued until all buoys and sources have been connected to their respective connectors along chain 30 and source assembly 11 has been deployed.

To retrieve hose assembly 11, the above procedure is reversed. Chain 30 is reeled in and buoy 81 is picked up by a hook or the like and placed on deck 22 as the buoy approaches vessel 10. After connector 34 passes through track 25, both pins 71 are removed from connector 34 to respectively release buoy 81 and source 13 from chain 30. This is continued until all buoys and sources have been retrieved. Chain 30 with connectors 34 still attached is reeled onto reel 31 and hose assembly with sources 13 are stacked on vessel 10 as is known in the art.

It will be noted in FIG. 2 that track 25 is positioned so that source assembly 11 including sources 13 are lifted upward with respect to deck 32 as chain 30 is reeled in. This prevents the assembly and sources from contacting the stern of vessel 10 as they are retrieved thereby eliminating a major source of possible damage to the source assembly. Also, track 25 is slightly curved downward at either end thereof (see FIG. 3) to provide a good angle of approach to track 25 for chain 30 and connectors 34 during both deployment and retrieval of source assembly 1.

What is claimed is:

1. A system for deploying and retrieving a seismic source assembly from a marine vessel having at least an upper deck and a lower deck, said system comprising:
   a guide structure affixed to the underside of said upper deck;
   a strain absorbing element comprising a chain passing through said guide structure and adapted to be deployed and retrieved from said lower deck;
   at least one connector means affixed to and positioned at a desired position on said strain absorbing element having two sections, each section having an internal groove conforming essentially to a portion of a link of said chain whereby when said sections are positioned together in an operable position on said chain, said grooves will receive a link of said chain;
   means to secure said sections together;
   means for attaching a seismic source to said at least one connector means; and wherein said guide structure comprises
   a track means through which said strain absorbing element and said at least one connector means affixed thereto passes, means to mount said track means to said underside of said upper deck, and wherein said track means has a continuous open slot throughout its lower length adapted to receive said seismic source attaching means as said at least one connector means passes through said track means whereby said strain absorbing element and said at least one connector means can pass through said track means with said seismic source attached to said at least one connector means.

2. The system of claim 1 including:
   means for attaching a buoy line to said at least one connector means.

3. A system for deploying and retrieving a seismic assembly, such system comprising:
   strain absorbing element;
   at least one connector means affixed to and positioned at a desired position on said strain absorbing element, said at least one connector means having two sections, each section having an internal groove conforming essentially to a portion of said strain absorbing element whereby when said two sections are positioned together in an operable position on said strain absorbing element, said grooves will receive a portion of said strain absorbing element;
   means for attaching a buoy line to said at least one connector means;
   means for attaching a seismic source to said at least one connector means; and a track means through which said strain absorbing element and said at least one connector means affixed thereto passes said track means has a continuous open slot thorughout its lower length adapted to receive said seismic source attaching means as said at least one connector means passes through said track means whereby said strain absorbing element and said at least one connector means can pass through said track means with said seismic source attached to said at least one connector means and said track means has a continuous open slot throughout its upper length adapted to receive said buoy line attaching means as said at least one connector means passes through said track means whereby said strain absorbing element and said at least one connector means can pass through said track means with said buoy line attached to said at least one connector means.

4. The system of claim 3 wherein:

said two sections of said at least one connector means defining an upper slot and a lower slot when said said sections are in an assembled condition, said means for attaching said seismic source comprising:

a first element attached to said seismic source and adapted to be received in said lower slot of said at least one connector means, and a pin adapted to pass through an opening in said at least one connector means and through an opening in said element attached to said seismic source to secure said first element in said lower slot of said at least one connector means; and said means for attaching said buoy line comprising:

a second element attached to said buoy line and adapted to be received by said upper slot of said at least one connector means, and a pin adapted to pass through an opening in said at least one connector means and through an opening in said second element attached to said buoy line to secure said second element in said upper slot of said at least one connector means.

5. The system of claim 4 wherein said at least one connector means further comprises:

a plurality of connector means, each affixed to said strain absorbing element at a position at which a seismic source and a buoy line is to be attached to said strain absorbing element.

* * * * *